United States Patent [19]
Herbst

[11] Patent Number: 5,283,692
[45] Date of Patent: Feb. 1, 1994

[54] MULTI-LAYER GRADED REFLECTIVITY MIRROR

[75] Inventor: Richard L. Herbst, Palo Alto, Calif.

[73] Assignee: Spectra Physics Lasers, Inc., Mountain View, Calif.

[21] Appl. No.: 824,715

[22] Filed: Jan. 17, 1992

Related U.S. Application Data

[63] Continuation of Ser. No. 383,865, Jul. 21, 1989, abandoned.

[51] Int. Cl.$^5$ .......................... G02B 1/10; G02B 5/28; G02B 5/26
[52] U.S. Cl. .................................. 359/580; 359/588; 359/589; 359/884
[58] Field of Search ................. 350/1.6, 1.7, 164, 166, 350/172, 600, 601, 642; 359/359, 360, 580, 582, 584, 585, 588, 589, 884, 888, 883

[56] References Cited

U.S. PATENT DOCUMENTS

| | | | |
|---|---|---|---|
| 4,310,808 | 1/1982 | Byer et al. | 331/94.5 |
| 4,360,925 | 11/1982 | Brosnan et al. | 372/95 |

FOREIGN PATENT DOCUMENTS

| | | | |
|---|---|---|---|
| 89830354.0 | 2/1990 | European Pat. Off. | G02B 5/08 |
| 0141149 | 11/1979 | Japan | 350/164 |

OTHER PUBLICATIONS

Siegman, Lasers (University Science Books, 1986) pp. 47–48.
De Silvestri et al., "Nd:YAG Laser With Multi Dielectric Variable Reflectivity Output Coupler", Optical Communications, vol. 67, No. 3, pp. 229–232, Jul. 1, 1988.
Advertisement for Quantel's Datachrome Line of Q-Switched Nd:YAG Lasers, Quantel International, Santa Clara, Calif.
Piegari et al., "Optical Coatings with Radially Variable Reflectance", FA16-1, pp. 406–408, Proceeding Office OSA, Topical Conference on Optical Through Filters, Tucson, Apr. 1988.
Zizzo et al., "Fabrication and Characterization of Tuned Gaussian Mirrors for the Visible and Near Infra Red", Optics Letters, vol. 13, No. 5, May 1988, 342–344.
Caprara et al., "Injection Seeding of a Nd:YAG Laser Utilizing a Radially Variable Reflectivity Output Complex", SPIE, Jan. 1988, pp. 1–12.
De Silvestri et al., "Solid State Laser Unstable Resonators With Tapered Reflectivity Mirrors: The Super-Gaussian Approach", IEEE Journal of Quantum Electronics, vol. 24, No. 6, pp. 1172–1177, Jun. 1988.
Lavigne et al., "Design and Characterization of Complementary Gaussian Reflectivity Mirrors", Applied Optics, vol. 24, No. 16, 15 Aug. 1985, pp. 2581–2586.

(List continued on next page.)

Primary Examiner—Bruce Y. Arnold
Assistant Examiner—R. D. Shafer
Attorney, Agent, or Firm—Mark A. Haynes

[57] ABSTRACT

A multi-layer graded reflectivity mirror (GRM) with high effective reflectivity is suitable for use in large aperture laser systems with relatively low gain. The GRMs are manufactured with multiple dielectric layers with a thickness profile that eliminates the interference fringes, while providing a reflectivity which tapers smoothly from a peak to zero. The mirror is formed on a substrate having a first surface and a second surface opposite the first. The substrate consists of a material which has low absorption at a given wavelength $\lambda$. A first dielectric layer is formed on the first surface of the substrate which has an index of refraction $n_1$ and having an optical thickness profile with a maximum optical thickness of $\lambda/4$ at a center which essentially continuously decreases away from the center to a minimum optical thickness of Z at a perimeter P. A second dielectric layer is formed on the first dielectric layer having an index of refraction $n_2$ and a thickness profile which is similar to the thickness profile of the first dielectric layer. Additional dielectric layers can be added as necessary to achieve the reflectivity magnitude desired. The thickness Z is the thickness at which the reflectivity profile reaches zero at the first interference fringe.

9 Claims, 12 Drawing Sheets

OTHER PUBLICATIONS

McCarthy et al., "Large Size Gaussian Mode in Unstable Resonators Using Gaussian Mirrors", Optics Letters, vol. 10, No. 11, pp. 553-555, Nov. 1985.

N. Hodgson, "Optical Resonators for High Power Lasers", Optisches Institut, Technische Universität Berlin, Strasse des 17, Juni 135, D-1000 Berlin 12, FRG. pp. 1-12.

"Gaussian Mirror Parameter Calculations Output Beam Intensity Profile and Film Thickness Calculations", Opt Lett., vol. 10, #11, p. 553, Nov. 1985.

Ganiel et al., "Eigenmodes of Optical Resonators with Mirrors Having Gaussian Reflectivity Profiles", Applied Optics, vol. 15, No. 9, pp. 2145-2149, Sep. 1976.

Parent et al., "Increased Frequency Conversion of Nd:YAG Laser with a Variable Reflectivity Mirror", National Optics Institute, P.O. Box 9970, Sainte-Foy, Québec, Canada, pp. 1-14.

Yariv et al., "Confinement and Stability in Optical Resonators Employing Mirrors with Gaussian Reflectivity Tapers", Optic Communications, vol. 13, No. 4, pp. 370-374, Apr. 1975.

Snell et al., "Single Transverse Mode Oscillation from an Unstable Resonator Nd:YAG Laser Using a Variable, Reflectivity Mirror", Optics Communications, vol. 65, No. 5, pp. 377-382, 1 Mar. 1988.

De Silvestri et al., "Unstable Laser Resonators with Super-Gaussian Mirrors", Optics Letters, vol. 13, No. 3, Mar. 1988, pp. 201-203.

Walsh et al., "Transverse Modes of a Laser Resonator with Gaussian Mirrors", Applied Optics, vol. 25, No. 17, pp. 2947-2954, 1 Sep. 1986.

McCarthy et al., "Optical Resonators with Gaussian Reflectivity Mirrors: Output Beam Characteristics", Applied Optics, vol. 23, No. 21, pp. 3845-3850, 1 Nov. 1984.

Parent et al., "Variable Reflectivity Unstable Nd:YAG Resonator with a Flat-Top Output Beam", INRS-Energie, C. P. 1020, Varennes, Québec, Canada; CLEO '88 Conference Submission, pp. 1-3.

Snell et al., "Fundamental Mode Operation of a Pulsed Nd:YAG Laser With a Variable Reflectivity Mirror," Université Laval, Québec, Canada, pp. 1-5.

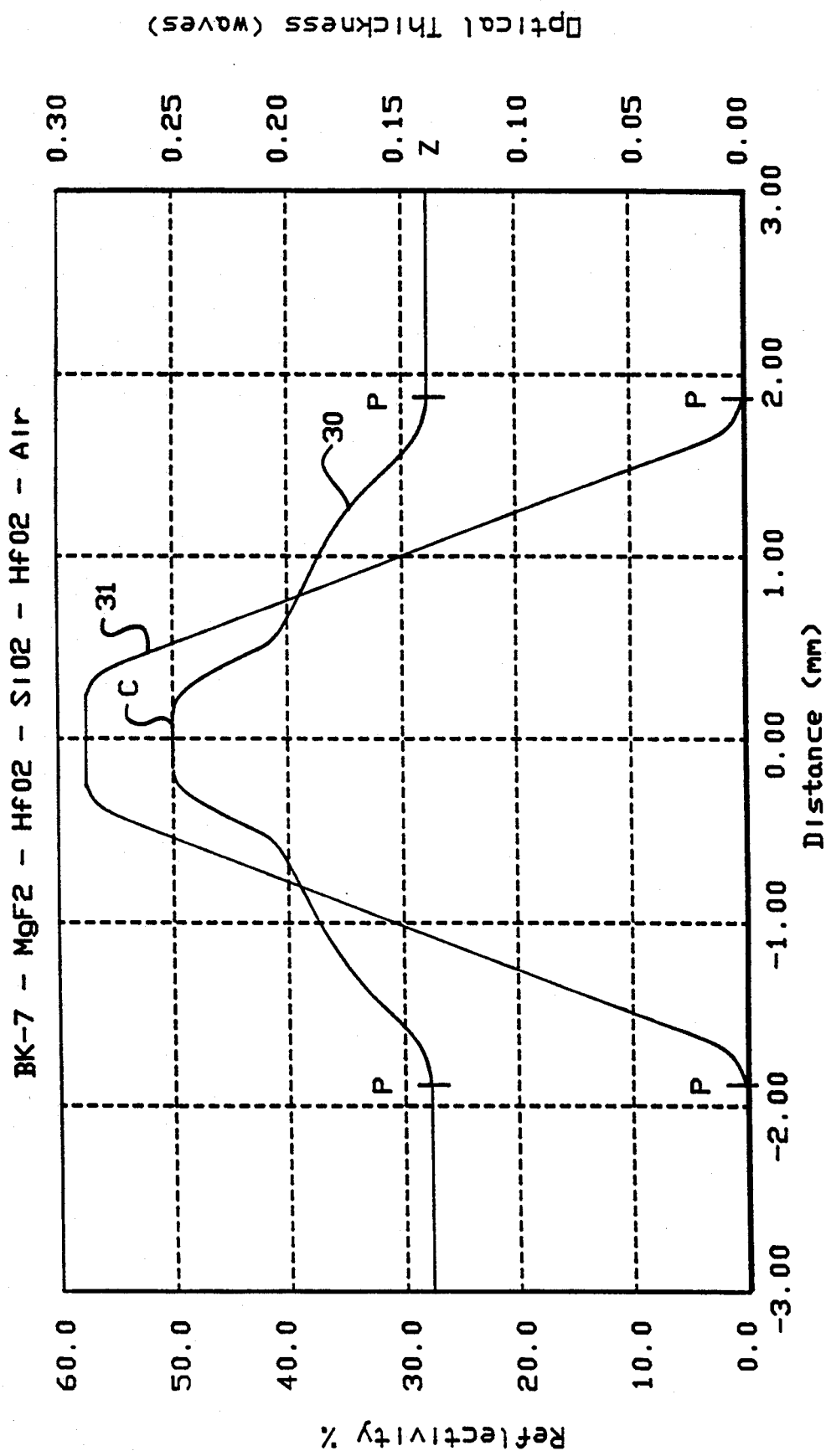
FIG.—3

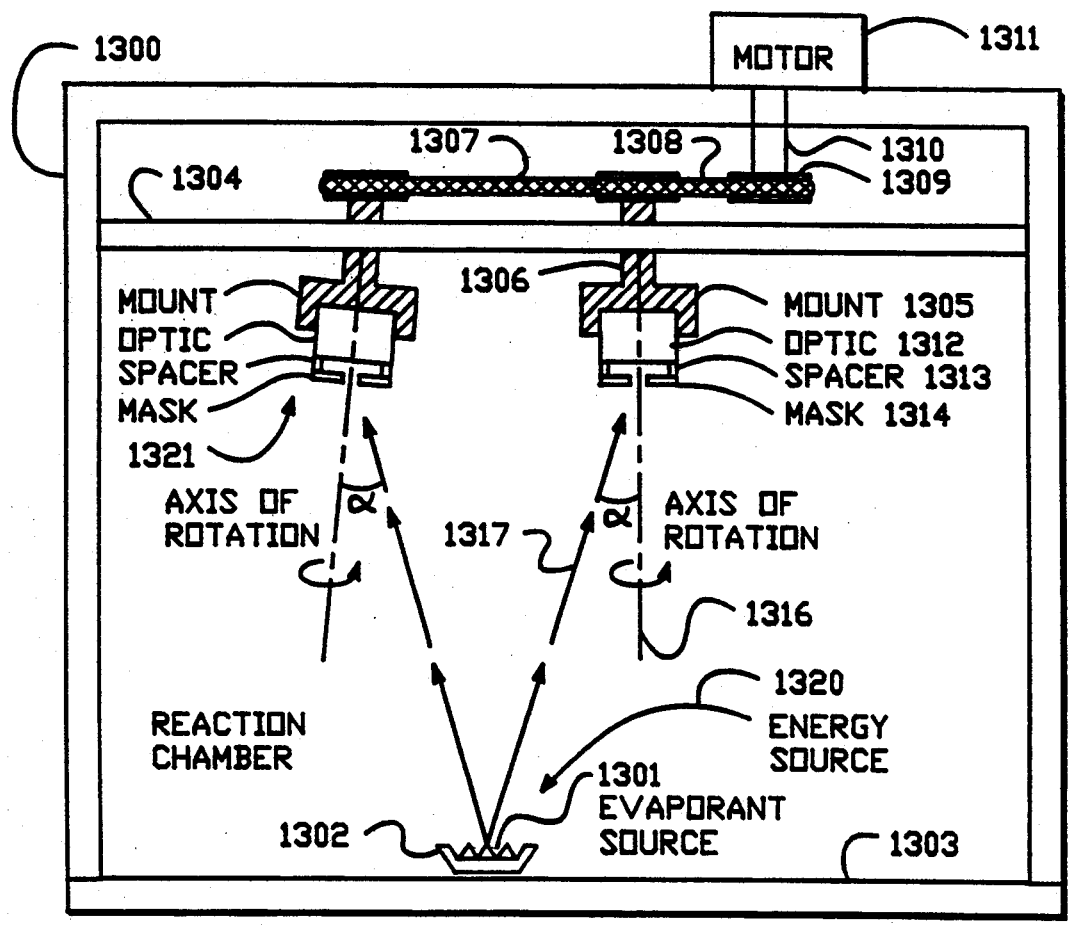
FIG.—13
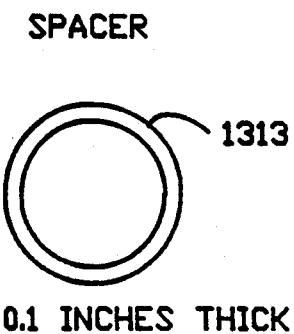
FIG.—13A
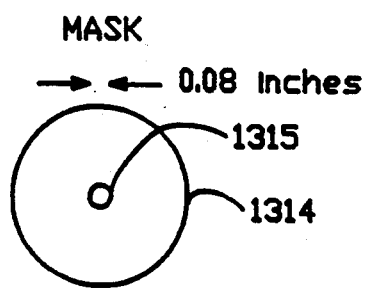
FIG.—13B

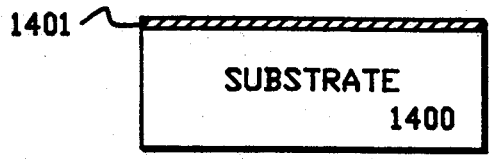
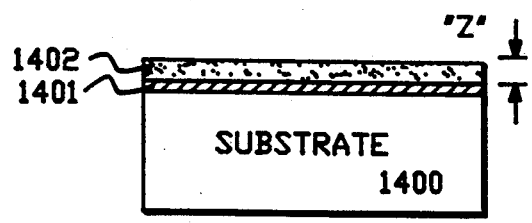
FIG.—14A   FIG.—14B
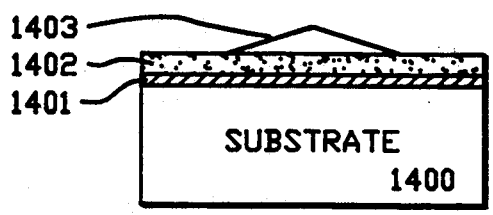
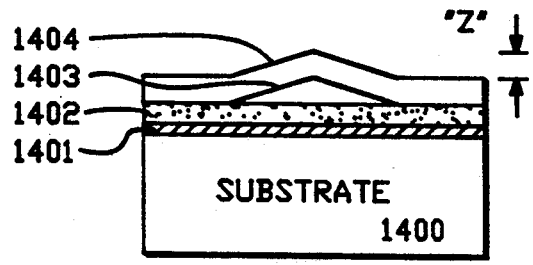
FIG.—14C   FIG.—14D
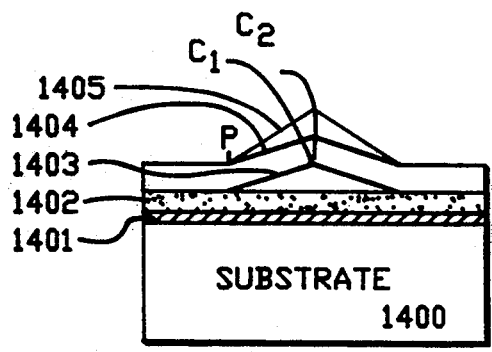
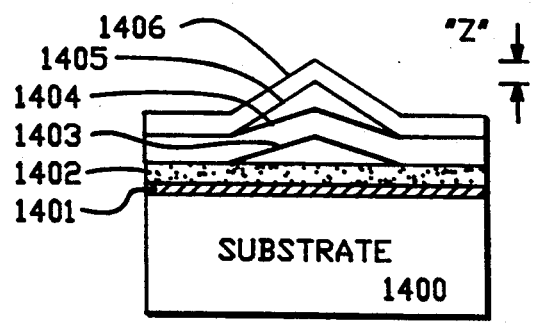
FIG.—14E   FIG.—14F
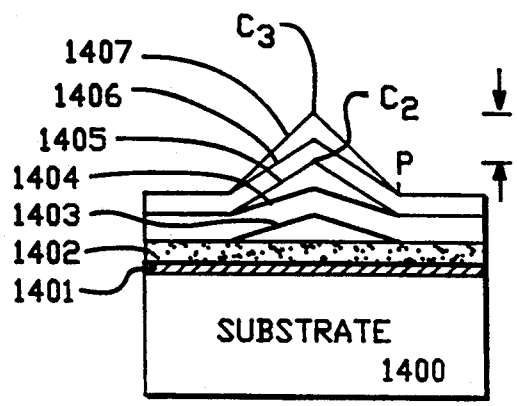
FIG.—14G

MULTI-LAYER GRADED REFLECTIVITY MIRROR

This application is a continuation of Ser. No. 07/383,865, filed Jul. 21, 1989, now abandoned.

BACKGROUND OF THE INVENTION

1. Field of the Invention

The present invention relates to graded reflectivity mirrors, such as are used for output couplers in unstable laser resonators; and, more particularly, to graded reflectivity mirrors with high effective reflectivity manufactured from multiple dielectric layers.

2. Description of Related Art

Unstable laser resonators are commonly employed to achieve transverse mode patterns that fill, or nearly fill, the available volume within a gain medium of a laser resonator for high efficiency, while suppressing higher order transverse modes. The typical output coupler for unstable resonators of the prior art is the "dot" mirror. These dot mirror output couplers have a low effective reflectivity because they use the spreading of the beam outside of the central reflective dot region on the output coupler as the coupling mechanism. This property has limited the usefulness of unstable resonator designs to laser systems with relatively high gain. See Siegman, LASERS (University Science Books, 1986) pp. 47–48; and U.S. Pat. No. 4,310,808, entitled HIGH POWER LASER EMPLOYING AN UNSTABLE RESONATOR, invented by Byer and Herbst.

An alternative output coupler of the prior art for unstable resonators is known as the variable, or graded, reflectivity mirror. Use of graded reflectivity mirrors (GRMs) as output couplers for unstable resonators greatly improves the output beam quality of the resonator. In these output couplers, rather than having a dot of high reflectivity with hard edges as an output coupler, a tapered layer of dielectric is formed on a substrate causing a radially variable reflectivity profile. The layer typically has an optical thickness of a quarter wavelength at the center and smoothly as possible tapers to a thickness of 0. The taper is generally assumed to cause a Gaussian reflectivity profile from a peak at the center to 0 reflectivity at the edges of the dielectric layer. See, for instance, De Silvestri et al., "Nd:YAG Laser with Multi Dielectric Variable Reflectivity Output Coupler", OPTICAL COMMUNICATIONS, Vol. 67, No. 3, pp. 229–232, Jul. 1, 1988 (and references cited therein).

GRMs also suffer the problem of relatively low effective reflectivity. The low effective reflectivity results mainly because materials suitable for manufacturing the mirrors do not have high enough reflectivity in the geometries commonly used, particularly in the visible and near infra red ranges. Therefore, GRMs have been limited, as have the dot mirrors, to systems with high gain. One such laser system is manufactured by Quantel International, Santa Clara, Calif. (Quantel's Datachrome line of Q-switched Nd:YAG Lasers). For lower gain systems, the GRM output coupler has not proved practical.

The effective reflectivity of GRMs can be improved by using a multi-layer mirror as described by Piegari et al., "Optical Coatings with Radially Variable Reflectance", FA16-1, pp. 406–408, Proceeding Office OSA, Topical Conference on Optical Through Filters, Tucson, April 1988, and Zizzo et al., "Fabrication and Characterization of Tuned Gaussian Mirrors for the Visible and Near Infra Red", OPTICS LETTERS, Vol. 13, No. 5, May 1988, 342–344.

However, the smooth reflectivity taper is lost for such multi-layer mirrors due to the interference fringes which cause rings of zero reflectivity in the mirror. FIG. 1 is a graph of the reflectivity of a mirror formed of three tapered dielectric layers. The graph shows the optical thickness of each of the three layers at trace 10, where optical thickness is equal to the index of refraction n times the actual thickness T. The reflectivity profile of the mirror as a whole is shown at trace 11. The mirror is formed on a BK-7 substrate having an anti-reflective coating on a first surface. A first dielectric layer of $HfO_2$ is formed with the optical thickness profile of trace 10. On top of the first layer, a second dielectric layer of $SiO_2$ is formed having the same optical thickness profile. Finally, a third dielectric layer of $HfO_2$ is formed with the same optical thickness profile. Thus, the optical thicknesses of the three layers have profiles that start at 0.25 wavelengths at the center and continuously decrease to a thickness of 0 at the perimeter of about 1.8 mm radius.

For a single layer graded reflectivity mirror, the zero reflectivity perimeter would match the zero thickness perimeter of the dielectric layer. However, for the multi-layer embodiment of FIG. 1, an interference fringe at radius of approximately 0.6 mm (point 12 in FIG. 1) is induced. This forms a ring of zero reflectivity that effectively limits the size of the transverse mode that can be effectively coupled using the multi-layer GRM. This characteristic limits the usefulness of multi-layer GRMs of the prior art to laser systems with relatively small effective apertures.

The problem caused by the rings of zero reflectivity in multi-layer GRMs becomes more pronounced as the number of dielectric layers is increased. Therefore, the higher the reflectivity required and the more layers used to achieve that reflectivity, the smaller the effective aperture of the output coupler becomes. The small effective aperture complicates the problem of utilizing the optimum amount of the volume of the gain media.

Accordingly, it is desirable to provide GRMs for use in unstable laser resonator and other laser related applications that can be used with large aperture laser systems and systems with relatively low gain.

SUMMARY OF THE INVENTION

According to the present invention, GRMs with high effective reflectivity that are suitable for use in large aperture laser systems with relatively low gain are provided. The GRMs, according to the present invention, are manufactured with multiple dielectric layers with a thickness profile that eliminates the interference fringes, while providing a reflectivity which tapers from a peak to zero.

The mirror, according to the present invention, comprises a substrate having a first surface and a second surface opposite the first. The substrate consists of a material which has low absorption at a given wavelength $\lambda$. A first dielectric layer is formed on the first surface of the substrate which has an index of refraction $n_1$ and has an optical thickness profile with a maximum optical thickness of $\lambda/4$ at a center which essentially continuously decreases away from the center to a minimum optical thickness of Z at a perimeter P. A second dielectric layer is formed on the first dielectric layer having an index of refraction $n_2$ and an optical thickness profile which is similar to the optical thickness profile of the first dielectric layer. Additional dielectric layers can be added as necessary to achieve the reflectivity magnitude desired.

The optical thickness Z is the thickness at which the reflectivity profile reaches zero at the first interference fringe. For a three layer embodiment using the materials of FIG. 1, the optical thickness Z equals approximately $0.14\lambda$.

In a preferred system, the dielectric layers are organized so that a first layer has a high refractive index, the second layer has a low refractive index, the third layer has a high refractive index, and so on, repeating the high-low pattern until the desired reflectivity is achieved.

According to another aspect of the present invention, a method for manufacturing multi-layer GRM according to the present invention is provided. The method includes the steps of depositing a first layer of a first dielectric material of uniform optical thickness Z on a substrate. Second, a layer of the first dielectric material having a radially variable thickness with a maximum optical thickness of $(\lambda/4)-Z$ in the center and a minimum thickness of 0 at a perimeter is deposited. Next, a second dielectric material is deposited in a layer of uniform optical thickness Z over the first graded thickness layer. Then, a layer of the second dielectric material with a maximum thickness at the center of $(\lambda/4)-Z$ and radially decreasing continuously to a thickness of 0 at the perimeter is laid over the uniform thickness layer of the second material. Next, for a GRM having three dielectric layers, a final layer of a third dielectric material, where the third dielectric material and the first dielectric material may be the same, is deposited over the second dielectric material. Then, over the third uniform thickness layer, a graded thickness layer having a maximum thickness of $(\lambda/4)-Z$ and radially decreasing to 0 at the perimeter is deposited.

According to another aspect of the present invention, a laser employing a multi-layer GRM as an output coupler is provided.

Other aspects and advantages of the present invention can be seen upon review of the drawings, the detailed specification, and the claims which follow.

BRIEF DESCRIPTION OF THE FIGURES

FIG. 3 is a graph of the reflectivity and optical thickness profiles for a three layered GRM, according to the present invention.

FIG. 13 is a schematic diagram of an apparatus used to manufacture the GRM of the present invention.

FIG. 13A is a top view of a spacer used in the apparatus of FIG. 13.

FIG. 13B is a top view of a mask used in the apparatus of FIG. 13.

FIGS. 14A-14G illustrate steps in the manufacturing process for a three layer GRM according to the present invention.

DETAILED DESCRIPTION

With reference to the figures, a detailed description of preferred embodiments of the present invention is provided.

Figure 2:
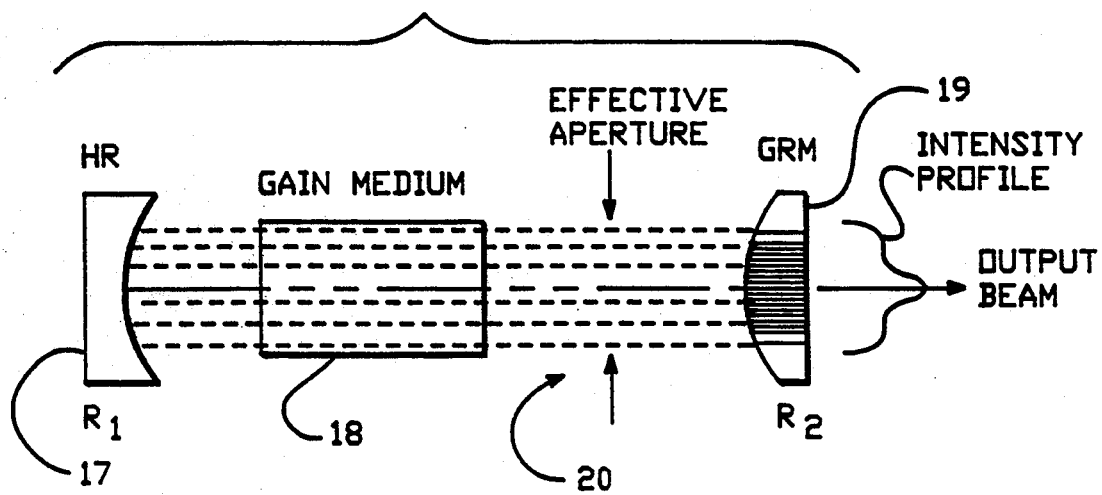
FIG. 2 is a schematic diagram of a laser employing a multi-layer GRM as an output coupler, according to the present invention.

FIG. 2 is a schematic diagram of a laser system using an unstable resonator 16. The unstable resonator includes a high reflecting back mirror 17 with a radius of curvature $R_1$. A gain medium 18 is mounted inside the resonator 16. An output coupler formed of a GRM 19 is included. The GRM 19 has a radius of curvature $R_2$. The magnification of the unstable resonator 16 is greater than one, as defined by the radius of curvature $R_1$ of the high reflecting mirror 17 and the radius of curvature $R_2$ of the GRM 19, in combination with any focusing effects of the gain medium 18.

The unstable resonator 16 has an effective aperture, designated at 20. The effective aperture 20 is determined by the optics used in the resonator, the volume of the gain medium 18 and the characteristics of the output coupler 19 in the unstable resonator 16. As illustrated in FIG. 2, the effective aperture is very large relative to the size of the medium, so that the maximum volume of the gain medium is utilized by the beam oscillating in the resonator 16.

The gain medium 18 can be Nd:YAG, such as illustrated in the above referenced U.S. Pat. No. 4,310,808 with flash lamps providing excitation of the gain medium. Alternatively, the gain medium 18 can be a plasma tube, such as used in $CO_2$ or argon ion gas lasers. A laser with a very large aperture can be made with an Nd:glass medium in an unstable resonator using the GRM, according to the present invention.

Depending on the gain provided by the selected gain medium 18, and on the magnification of the resonator design, the peak reflectivity of the GRM 19, which is used as an output coupler, is determined using known techniques. See, Caprara et al., "Injection Seeding of a Nd:YAG Laser utilizing a Radially Variable Reflectivity Output Complex", SPIE, January 1988; and U.S. Pat. No. 4,360,925, entitled LASER EMPLOYING AN UNSTABLE RESONATOR HAVING AN OUTPUT TRANSMISSIVE MIRROR, invented by Brosnan and Herbst.

For systems with low gain, a higher effective reflectivity is required. Thus, using the resonator design fundamentals, the necessary effective reflectivity of the output coupler can be calculated using techniques known in the art.

It is a characteristic of the present invention that the GRM 19 can be adapted to be used with any gain medium regardless of the gain provided. Further, the GRM 19 can be adapted to operate in systems with very large effective apertures. Of course, the GRM 19 of the present invention can be used in other resonator designs than that described in FIG. 2.

Figure 1:
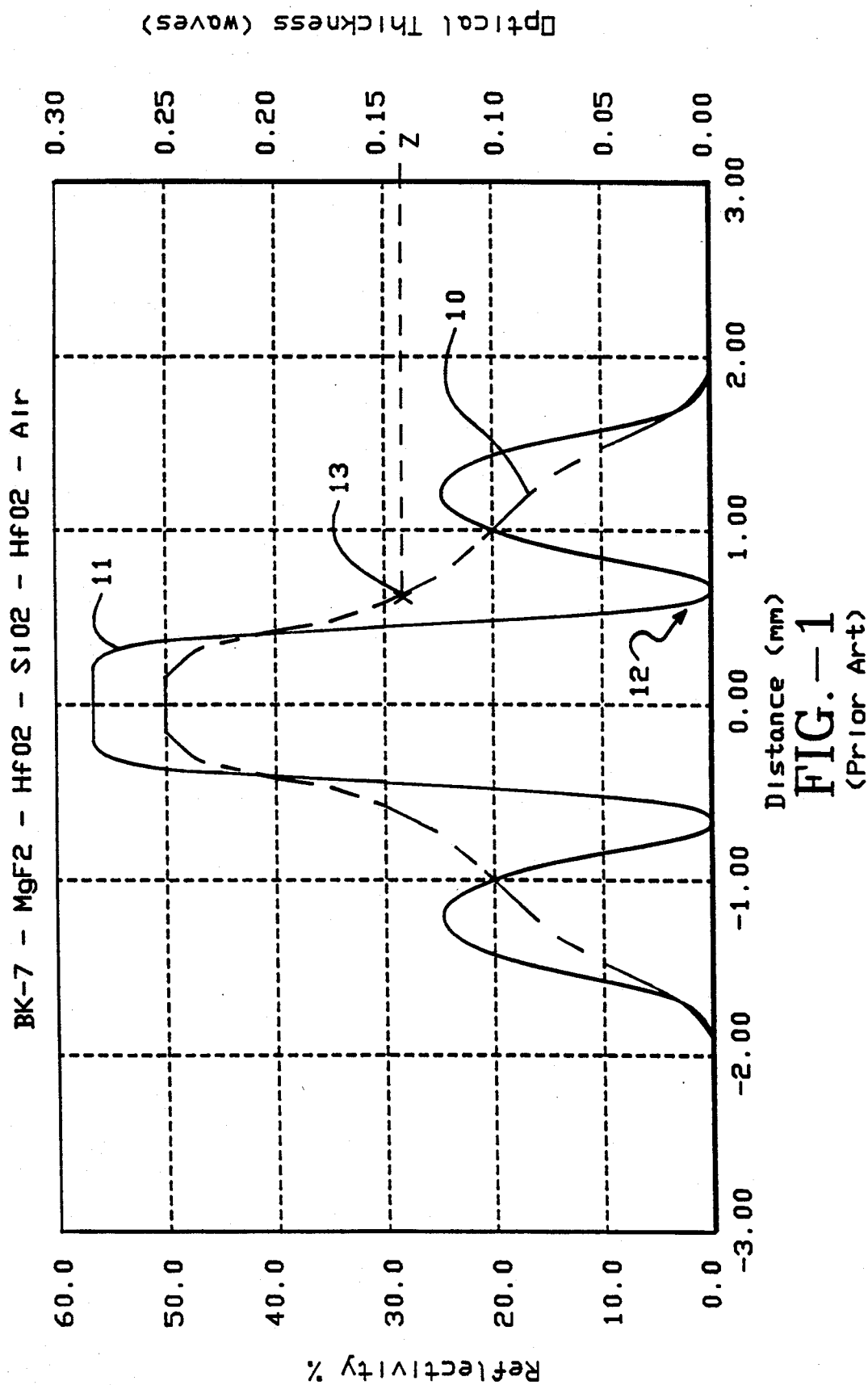
FIG. 1 is a graph illustrating the reflectivity profile and optical thickness profile of a multi-layer GRM, according to the prior art.

For systems requiring a high effective reflectivity, a multiple layer GRM may be required. However, as discussed with reference to FIG. 1, if the thickness of each of the succeeding layers of the dielectric is allowed to taper to zero, then interference fringes cause rings of zero reflectivity, such as point 12 in FIG. 1. The optical thickness at such zero reflectivity rings determines a first thickness at which zero reflectivity is accomplished for the GRM. This optical thickness can be determined by calculating the reflectivity profile for a GRM which allows for tapering to zero the thickness of the successive layers. The optical thickness at point 13 for the system in FIG. 1 is approximately 0.14 wavelengths.

Therefore, according to the present invention, a GRM with three dielectric layers having an optical thickness profile as illustrated in FIG. 3 at trace 30 is provided. It can be seen that the thickness profile provides for an optical thickness of 0.25 wavelengths at a center C and tapering optical thickness continuously decreasing down to a minimum optical thickness of $0.145 \lambda$ (within manufacturing tolerances) at a perimeter P. Outside the perimeter P, the thickness of the layer continues essentially at the thickness Z to outside the active region of the beam in the laser system in which the mirror is used.

Figure 4:
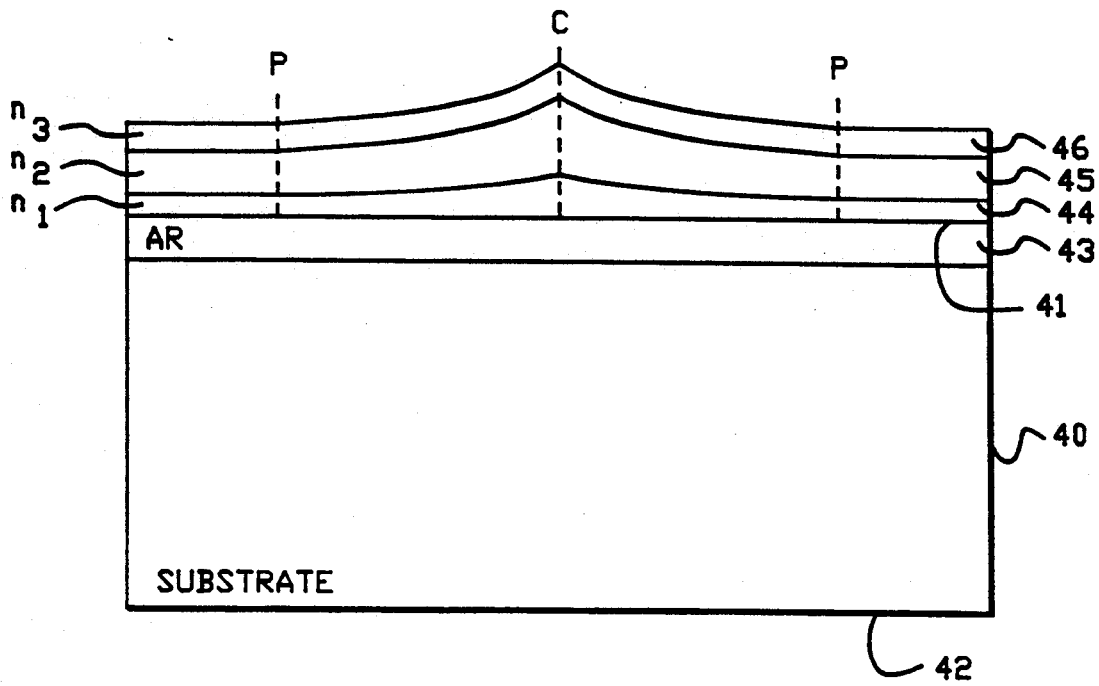
FIG. 4 is a cross-sectional view of a three-layer GRM, according to the present invention.

FIG. 4 illustrates one embodiment of a multi-layer GRM having a profile such as shown in FIG. 3. The mirror is formed on a substrate 40 have a first surface 41 and a second surface 42 opposite the first surface. The substrate 40 includes an anti-reflective coating 43 which defines the first surface 41 of the substrate 40. The anti-reflective coating may be magnesium-fluoride, or another suitable AR coating, as required for a given reflectivity. Next, a high index, first dielectric layer having an index of refraction $n_1$ is formed on the anti-reflective coating 43 so that it has an optical thickness profile as illustrated in FIG. 3 with a maximum thickness at center C of approximately $\lambda/4$ and continuously decreasing thickness down to a thickness of Z at the perimeter P. Outside the perimeter P, the thickness of the first dielectric layer $n_1$ continues at thickness Z to the edge of the substrate 40.

Likewise, a second dielectric layer, having a low index of refraction $n_2$, is deposited on top of the first dielectric layer 44. The index of refraction $n_2$ is less than the index of refraction $n_1$, therefore, the actual thickness of the second layer 45 is greater than the first layer 44. However, the optical thickness profile of the second dielectric layer 45 matches the optical thickness profile of the first layer 44.

Finally, a third dielectric layer 46 having a high index of refraction $n_3$ is deposited on top of the second dielectric layer 45. The third dielectric layer has the same optical thickness profile as the previous two layers.

For a system having the optical thickness profile as set out in FIG. 3 at trace 30, the reflectivity profile as set out at trace 31 is achieved. It can be seen that the peak reflectivity of approximately 57.68% is near the center C and is relatively flat for a small radius at the center C. Then the reflectivity tapers to zero reflectivity at the perimeter P and continues at zero out to the edge of the coating.

Figure 5:
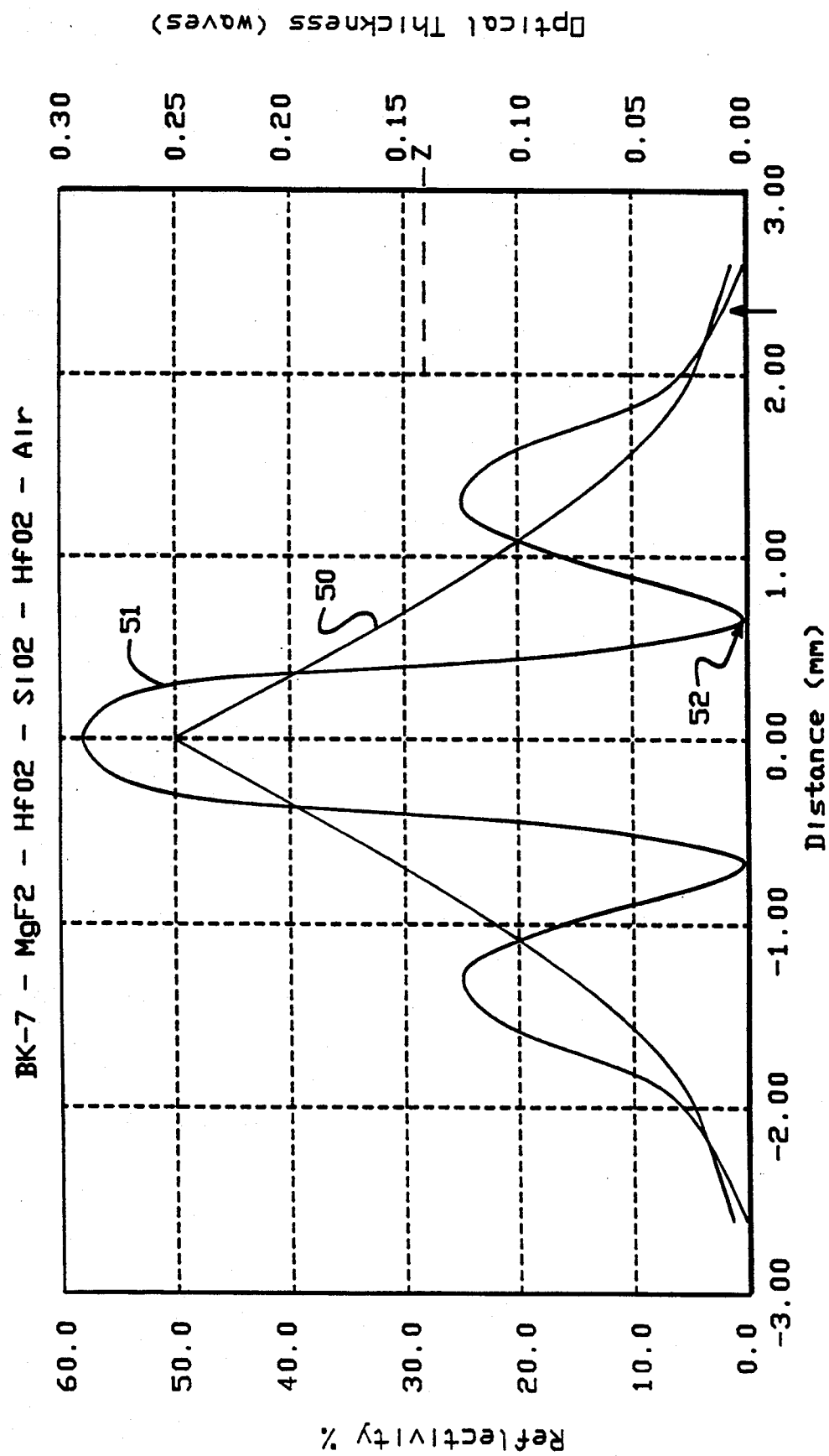
FIG. 5 is a graph of the reflectivity and optical thickness profiles of a multi-layer GRM with a super-Gaussian thickness profile on each of the dielectric layers where the thickness tapers to a minimum of 0, causing rings of zero reflectivity.

FIG. 5 illustrates the reflectivity profile and optical thickness profile for a super-Gaussian optical thickness profile on a three dielectric layer mirror. Thus, at trace 50 the shape of the dielectric layer is provided and at trace 51 the reflectivity profile is provided. It can be seen that a ring of zero reflectivity at radius indicated at point 52 is caused by the interference fringes. At thickness Z, the first minimum in the reflectivity profile is achieved.

Figure 6:
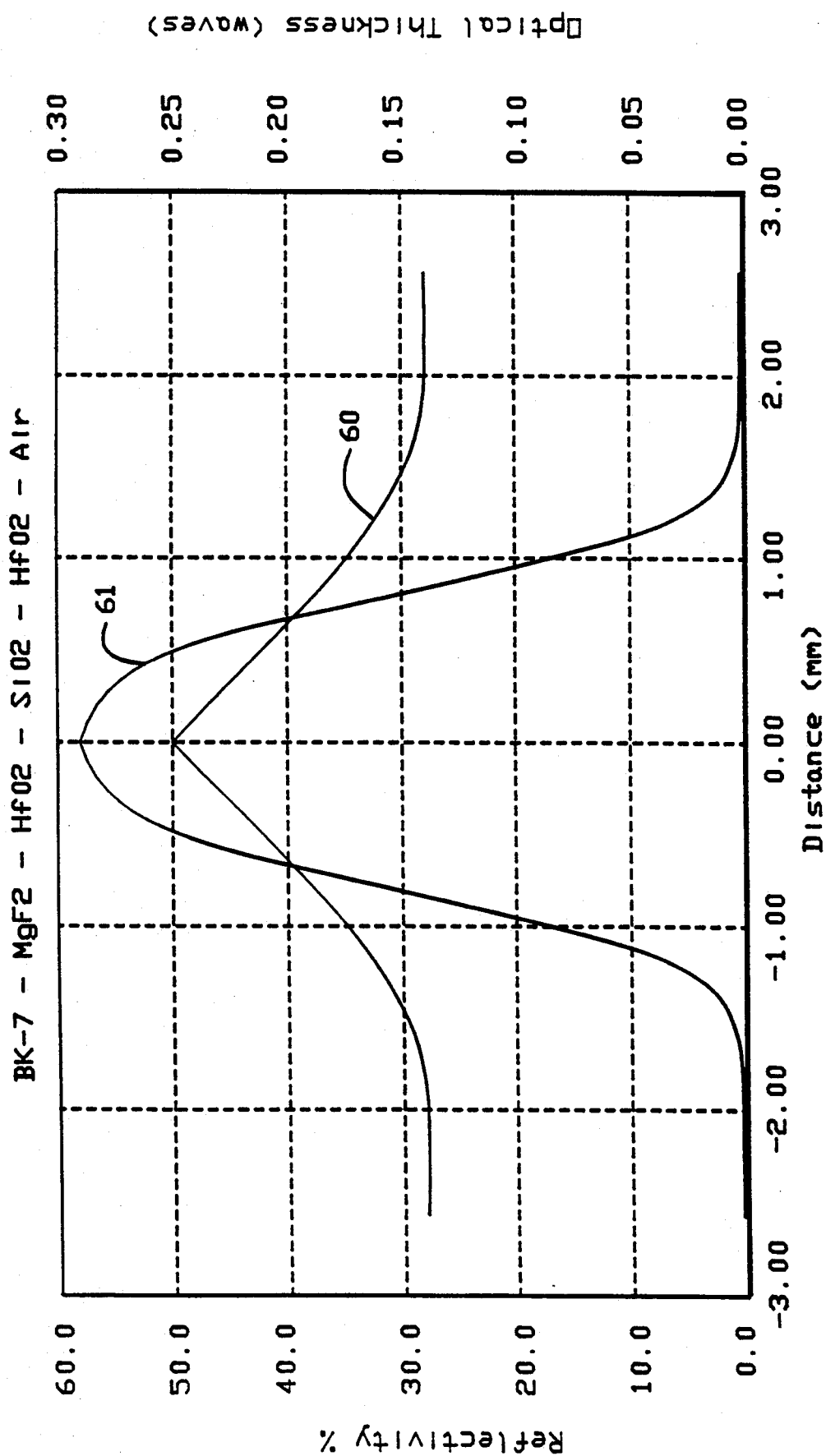
FIG. 6 is a graph of the reflectivity and optical thickness profiles of a three dielectric layer GRM with a modified super-Gaussian optical thickness profile, according to the present invention.

Thus, a multi-layer GRM, according to the present invention, with Gaussian thickness profile for the dielectric layers could be manufactured as shown in FIG. 6 with a modified super-Gaussian optical thickness profile of the dielectric layers at trace 60 resulting in a reflectivity profile at trace 61 for the three layer system with a peak reflectivity of 57.68%.

Figure 7:
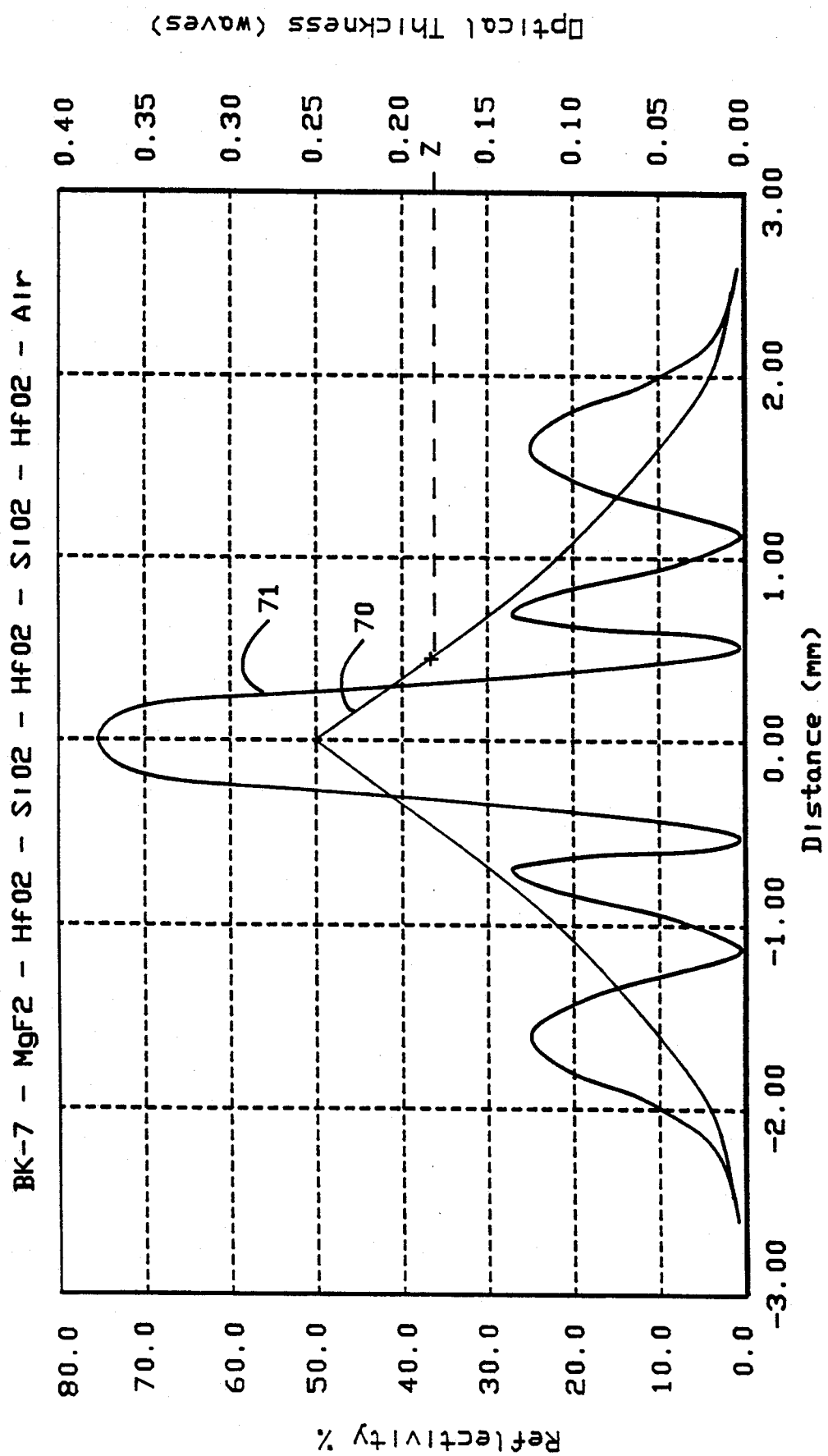
FIG. 7 is a graph of the reflectivity and optical thickness profiles of the five layer GRM with a super-Gaussian optical thickness profile which tapers to a minimum of 0, showing the interference fringes in the reflectivity profile.

FIG. 7 illustrates the optical thickness profile and reflectivity profile of a five layer $HfO_2/SiO_2$ GRM with a super-Gaussian thickness profile decreasing to zero thickness as shown at trace 70. The reflectivity profile at trace 71 illustrates the interference fringes with a first zero reflectivity ring at the optical thickness Z equal to approximately $0.177\lambda$.

Figure 8:
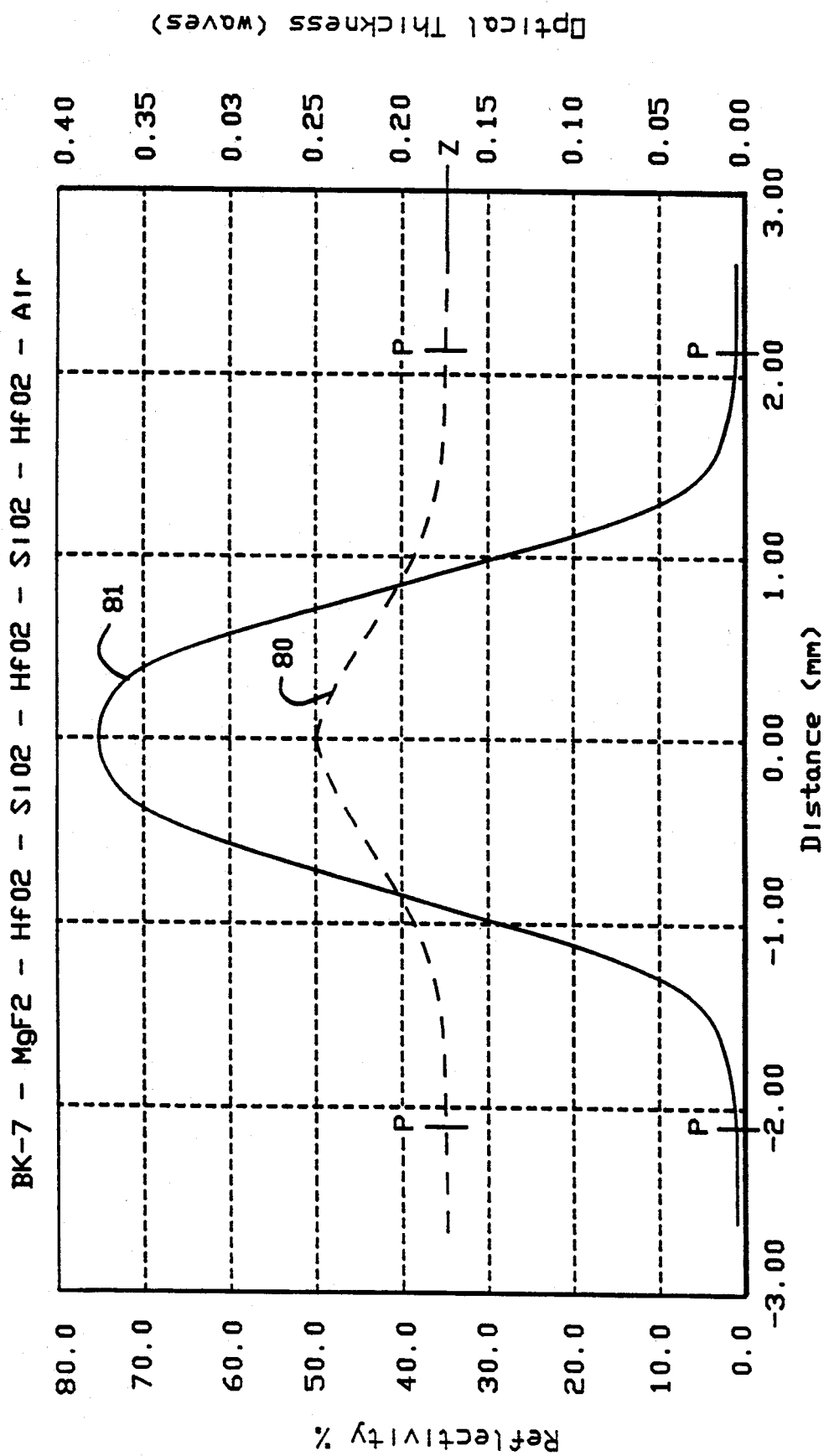
FIG. 8 is a graph of the reflectivity and optical thickness profiles of the five layer GRM with a modified super-Gaussian optical thickness profile, according to the present invention.

FIG. 8 is a chart showing a modified super-Gaussian optical thickness profile at trace 80 and the reflectivity profile at trace 81. The optical thickness profile begins at 0.25 waves at the center C and continuously decreases to a perimeter P of a thickness of Z. The reflectivity profile, as shown at 81, is a very fine Gaussian-like reflectivity curve. The value of Z for a system using five layers is approximated at 0.177 waves. Reflectivity in the center is calculated at 74.77% at a wavelength of 1064 nanometers.

Figure 9:
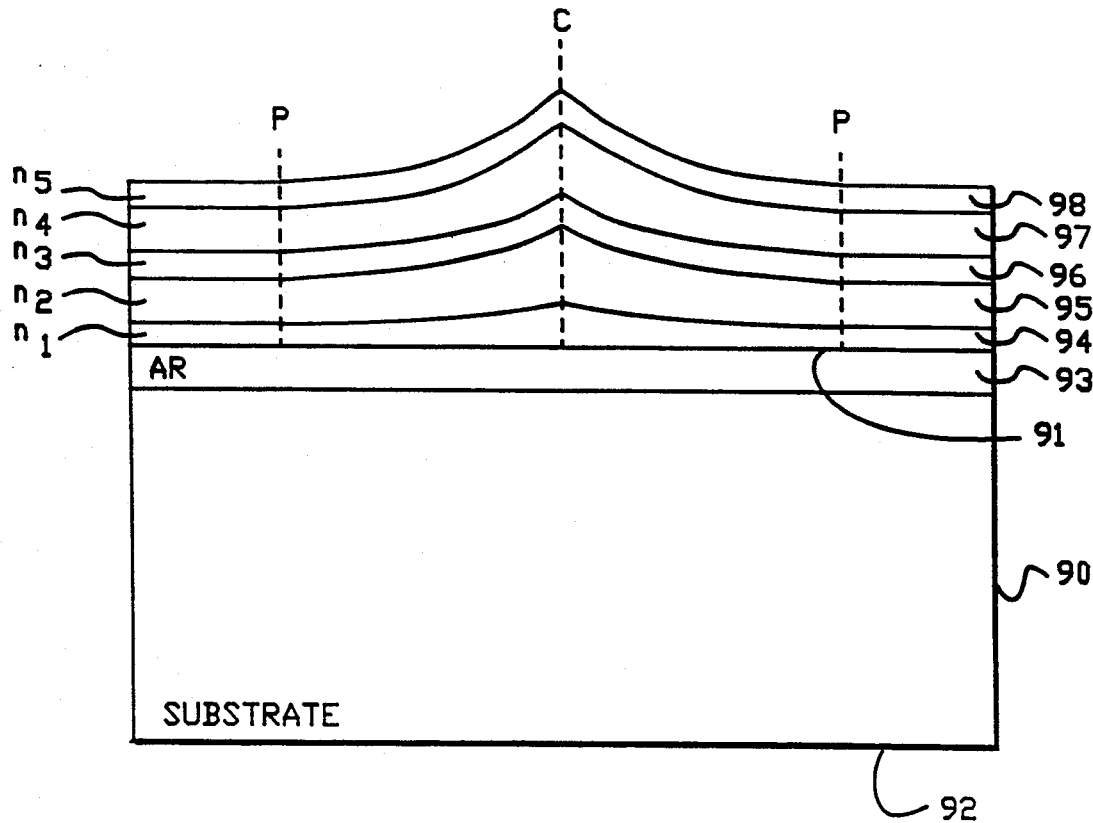
FIG. 9 is a cross-sectional view of a five layer GRM, according to the present invention.

FIG. 9 illustrates an implementation of a GRM using the reflectivity profile of FIG. 8. The mirror is formed on a substrate 90 which is transparent at the wavelength of interest. For a wavelength of 1064 nanometers, a substrate such as BK-7 is suitable. The substrate has a first surface 91 and a second surface 92 opposite the first. The substrate 90 includes an anti-reflective coating 93 which defines the first surface 91.

The first dielectric layer of $HfO_2$ with an index of refraction $n_1$ is deposited with a thickness profile as shown in FIG. 8. However, the distance from the center C to the perimeter P can be varied as required for the effective aperture size of the resonator. On top of the first dielectric layer 94 is formed a second dielectric layer 95 of $SiO_2$ with an index of refraction $n_2$. On top of the second dielectric layer 95 is formed a third dielectric layer 96 of $HfO_2$ with an index of refraction $n_3 = n_1$.

On top of the third dielectric layer 96 is formed a fourth dielectric layer 97 of $SiO_2$ having an index of refraction $n_4 = n_2$ with an optical thickness profile as in FIG. 8. The fifth dielectric layer 98 is formed on the fourth dielectric layer 97 and consists of $HfO_2$ with an index of refraction $n_5 = n_3 = n_1$.

Figure 10:
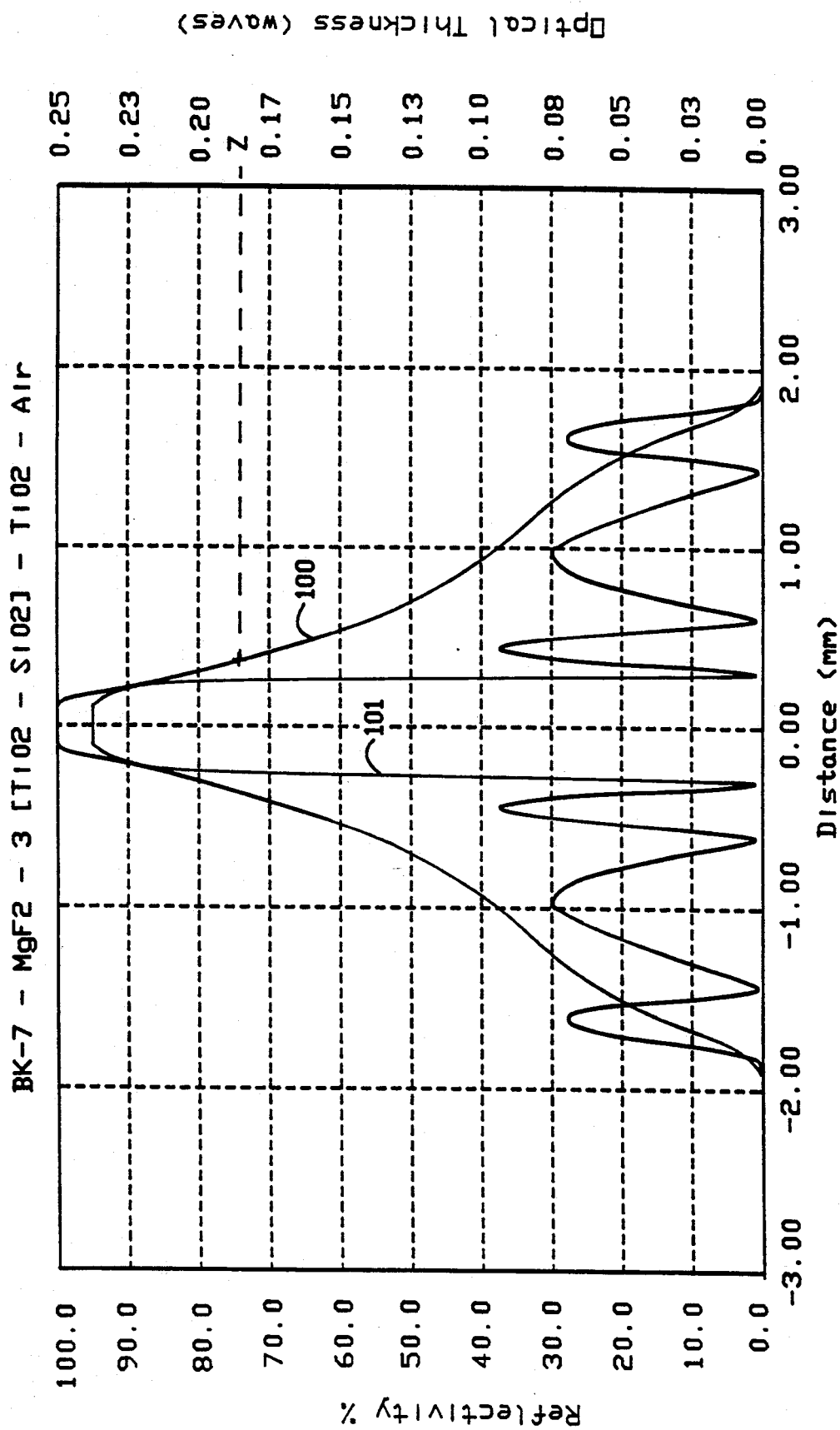
FIG. 10 is a graph showing the reflectivity and optical thickness profiles of a seven layer GRM, showing the interference fringes in the reflectivity profile.

For even higher reflectivities, a greater number of layers is required. Thus, in FIG. 10, a graph showing an optical thickness profile at trace 100 for a seven layer GRM using $TiO_2$ alternating with $SiO_2$ is disclosed. The reflectivity profile at trace 101 shows rings of zero reflectivity at optical thickness Z which is equal to approximately 0.185 wavelengths.

Figure 11:
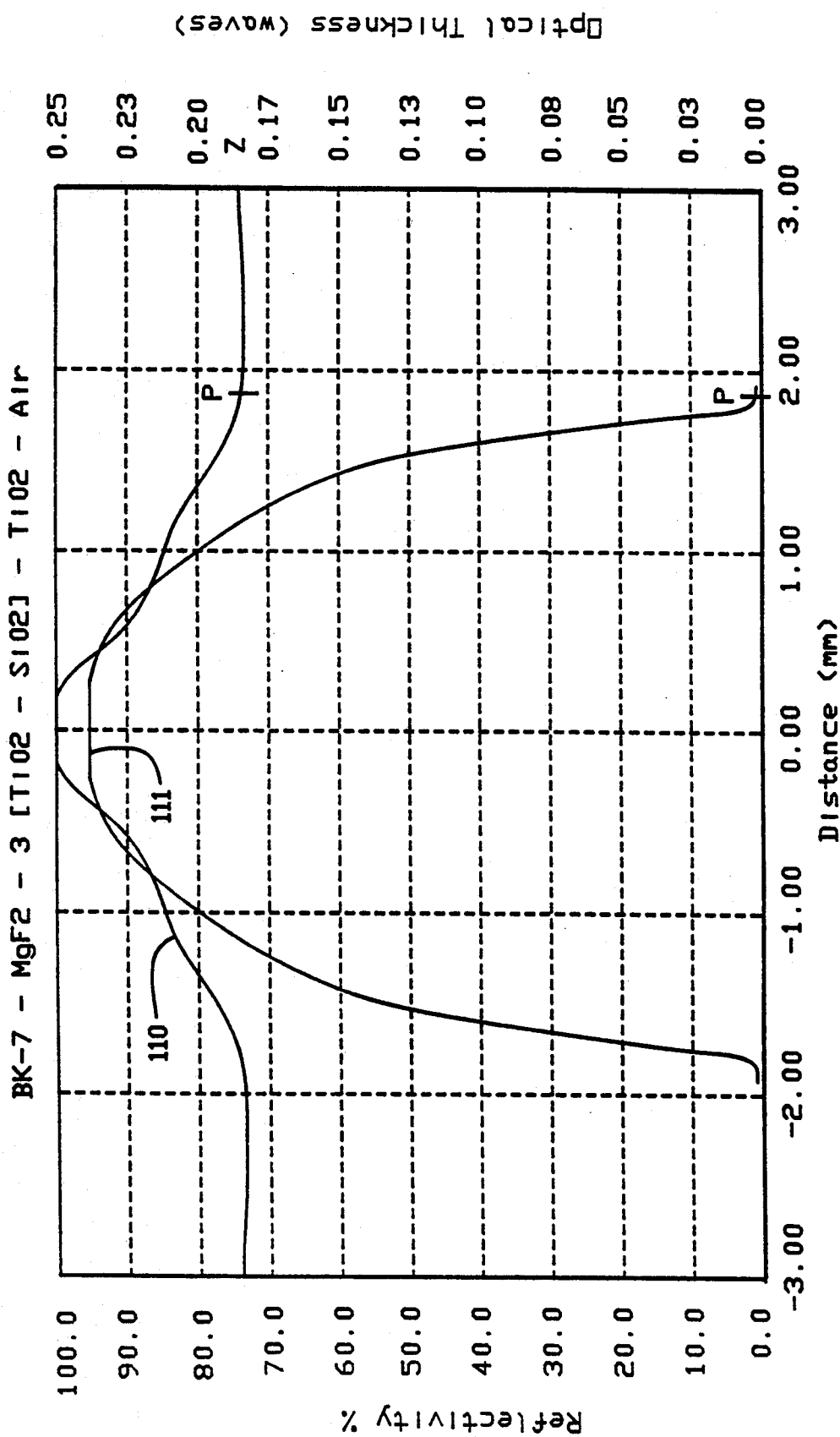
FIG. 11 is a graph showing the reflectivity and modified optical thickness profiles of a seven layer GRM, according to the present invention.

Therefore, for a seven layer system, an optical thickness profile as illustrated in FIG. 11 at trace 110 will achieve a reflectivity profile as shown at trace 111. As can be seen, the optical thickness profile begins at 0.25 wavelengths and essentially continuously decreases from the center C to a perimeter P where the optical thickness is equal to Z. The reflectivity profile is at a maximum at the center C with a relatively flat top and decreasing smoothly out to a reflectivity of zero at the perimeter P and continuing at zero out to the edge of the layers.

In the seven layer system illustrated in FIG. 11, for a wavelength of 1,064 nanometers, a peak reflectivity of 94.82% is calculated. Systems with such high peak reflectivity can be used in relatively low gain laser resonators.

Figure 12:
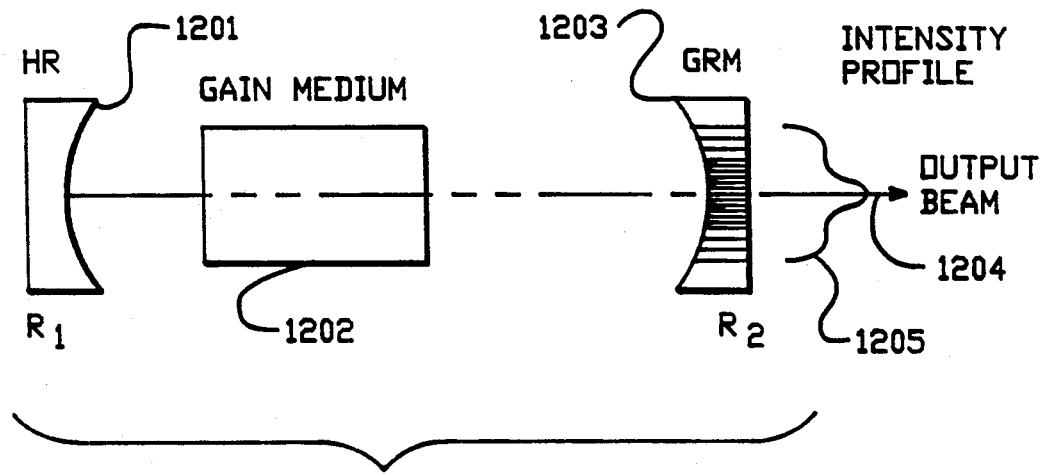
FIG. 12 is a schematic diagram of a laser with a stable resonant cavity using the GRM according to the present invention.

In FIG. 12, a schematic diagram of a stable resonator laser using a GRM according to the present invention is set out. In the schematic, the stable resonator 1200 is depicted as a system having a concave high reflecting back mirror 1201 with radius of curvature R1, a gain medium 1202 which includes means for exciting the gain medium to provide laser gain within the resonator, and an output coupler 1203 which is formed by a concave GRM. The radius of curvature of the output coupler GRM is $R_2$. Using a GRM as the output coupler, an output beam 1204 can be obtained with an intensity profile as shown at 1205. Thus, the GRM can be used for higher order transverse mode suppression and output beam shaping in a stable resonator.

FIG. 13 illustrates a reaction chamber 1300 utilized in generating radially variable thickness optics according to the present invention. The reaction chamber 1300 is adapted to be pumped to very low pressures using mechanisms not shown in the figure so that it will be suitable for deposition using evaporation of an evaporant source 1301. The evaporant source 1301 is placed in a holder 1302 on base plate 1303 of the reaction chamber 1300. The source 1301 is evaporated using an energy source 1320 such as an electron beam or other sources known in the art. A mounting plate 1304 is secured in the reaction chamber 1300 above the source 1301. An optic mount 1305 is supported by the plate 1304 in a bearing relationship which allows rotation of the mount 1305 about its axis 1316. A shaft 1306 on the mount 1305 extends through the plate 1304. A gear or pulley 1307 is mounted at the end of shaft 1306 above plate 1304. A belt 1308 couples the pulley 1307 to a motor pulley 1309. The motor pulley 1309 is coupled to shaft 1310 which is driven by motor 1311 in the neighborhood of 60 revolutions per minute. The shaft 1310 may be coupled into the reaction chamber using a vacuum feedthrough mechanism, such as a ferrofluidic feedthrough or the like. Alternatively, the motor can be mounted within the reaction chamber if it meets cleanliness specifications.

The optic 1312 to be coated is secured on mount 1305. A spacer 1313 is secured on the face of the optic 1312. A mask 1314 is then secured over the face of the optic 1312 and spacer 1313. A mechanism, not shown, for flipping the mask out of the way during deposition of uniform layers could be used. An aperture in the mask 1314 allows the evaporated source to reach the face of the optic 1312, according to a preferred distribution. The mount 1305 is rotated so that the distribution is uniformly distributed radially about the face of the optic 1312.

FIG. 13A illustrates the shape of the spacer 1313. As can be seen, it is similar to a washer that sits on the outside of the optic 1312. Alternative systems could use the spacer which does not mask the perimeter of the optic 1312 if desired. The thickness of the spacer 1313 which establishes the distance of the mask from the face of the optic 1312 for one embodiment is approximately 0.1 inch.

The mask is illustrated in FIG. 13B. The mask consists of a sheet of stainless steel approximately 0.005 inch thick with an aperture approximately 0.080 inch in diameter. The spacer, mask combination illustrated in FIGS. 13A and 13B is suitable for forming a radially variable thickness layer in the neighborhood of 0.1 inch in diameter.

The size of the radially variable thickness layer can be increased by increasing the scale of the optic, the spacer, the mask and/or the angle $\alpha$.

The radially variable thickness layer is established by mounting the optic 1312 on a rotatable mount such that the axis of rotation 1316 is normal to the optic 1312 and forms an angle $\alpha$ with the path 1317 of the evaporated source. For an embodiment described here, $\alpha$ is approximately 15°.

In the embodiment shown in FIG. 13, a second mount with optic assembly 1321 is illustrated. The reaction chamber 1300 could be modified to accommodate any number of mounts. Each mount would be placed in the chamber such that the face of the optic on the respective mount is perpendicular to the axis of rotation of the mount. Also, the axis of rotation of the mount should form the angle $\alpha$ with the path of the evaporated source which goes through the aperture in the mask. All of the mounts in the chamber could be driven by a single motor coupled to a belt and gear arrangement such as illustrated in FIG. 13.

By manipulating the angle of rotation of the optic, the source position, the spacer size, and the mask size and shape, the reaction chamber 1300 of FIG. 13 can be adapted to form practically any variety of radially variable thickness layers of dielectric.

FIGS. 14A–14G illustrate the steps involved in the process of manufacturing a three layer graded reflectivity mirror according to the present invention. As illustrated in FIG. 14A, the process begins with a substrate 1400 with an AR coating 1401. The substrate, with the AR coating, is then placed in a reaction chamber and a first uniform thickness layer optical thickness of Z of a first dielectric with index of refraction $n_1$. After the uniform thickness layer 1402 has grown, the mask is positioned over the substrate for growing a radially variable thickness layer. In this reaction chamber, the layer 1403 is grown so that the thickness at the center of the combination of layers 1402 and 1403 is equal to $\lambda/(4n_1)$. Further, the thickness radially varies down to $Z/n_1$ at perimeter P.

The next step is illustrated in FIG. 14D where the mask is moved away from the substrate and a second uniform thickness layer 1404 is grown over layers 1402 and 1403. The optical thickness of layer 1404 is uniformly Z. The second material has an index of refraction $n_2$ which is lower than the index of refraction $n_1$ of the first material in layers 1402 and 1403. Next, as shown in FIG. 14E, the mask is repositioned and the radially variable layer 1405 is grown over the layer 1404. This layer again is grown so that the distance from the peak C of layer 1405 to the peak C1 of layer 1403 is equal to $\lambda/(4n_2)$, and the thickness profile essentially continuously decreases radially away from the center C2 to a thickness of 0 at the perimeter P.

Next, as shown in FIG. 14F, a third uniform thickness layer of a third dielectric having an index of refraction $n_3$ is grown with the mask removed over layers 1405 and 1404. This layer is grown to have a uniform optical thickness Z.

Finally, as illustrated in FIG. 14G, the mask is repositioned and the radially variable thickness layer 1407 is grown over the layer 1406. This radially variable layer is grown such that the distance form the peak C2 of layer 1405 to the peak C3 of layer 1407 is equal to $\lambda/(4n_3)$. Further, the thickness profile of layer 1407 essentially continuously decreases from the center C3 to 0 at the perimeter P.

Using the technique illustrated in FIGS. 14A–14G, a multi-layer graded reflectivity mirror can be implemented in which the minimum optical thickness of the multiple dielectric layers is equal to the Z thickness at which the reflectance of the mirror goes to 0.

CONCLUSION

A number of examples of multi-layer GRMs has been presented. It will be appreciated by those in the art that the AR coating may not be necessary for a given effective reflectivity or application. Also, alternating materials with high index, low index, high index, and so on, while preferable, is not necessary for all reflectivities. The higher the number of dielectric layers, the less important the AR coating and the high-low-high sequence.

The multi-layer GRM is particularly suited as an output coupler for an unstable resonator. The multi-layer GRM may also be used in stable resonators for transverse mode suppression and enhancement of output beam profile, as shown in FIG. 12. Further, the multi-layer GRM of the present invention can be manufactured so that very large effective apertures are coupled.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A mirror having graded reflectivity at a given wavelength $\lambda$, comprising:
   a substrate, having a first surface and a second surface opposite the first surface.
   a first dielectric layer, on the first surface of the substrate, having an index of refraction $n_1$ and having an optical thickness profile with a maximum optical thickness of $\lambda/4$ at a peak area C and essentially continuously decreasing away from the peak area C to an optical thickness of greater than or equal to a determinate value Z at a perimeter P and continuing outside the perimeter P at a constant optical thickness equivalent to the optical thickness at the perimeter P for a distance D, wherein D is greater than zero;
   a second dielectric layer, on the first dielectric layer, having an index of refraction $n_2$ and having an optical thickness profile with a maximum optical thickness of $\lambda/4$ at the peak C and essentially continuously decreasing away from the peak area C to optical thickness of greater than or equal to the determinate value Z at the perimeter P and continuing outside the perimeter P at a constant optical thickness equivalent to the optical thickness at the perimeter P for a distance D greater than zero;
   wherein the determinate value Z is an optical thickness greater than zero at which the reflectivity of the mirror is near a minimum for the given wavelength $\lambda$.

2. The mirror of claim 1, further including:
   a third dielectric layer, on the second dielectric layer, having an index of refraction $n_3$ and having an optical thickness profile with a maximum optical thickness of $\lambda/4$ at the peak area C and essentially continuously decreasing away from the peak area C to an optical thickness of greater than or equal to the determinate value Z at the perimeter P and continuing outside the perimeter P at a constant optical thickness equivalent to the optical thickness at the perimeter P for a distance D, wherein D is greater than zero.

3. The mirror of claim 2, wherein
   the optical thickness profile of the first dielectric layer is essentially radially symmetrical;
   the optical thickness profile of the second dielectric layer is essentially radially symmetrical; and
   the optical thickness profile of the third dielectric layer is essentially radially symmetrical.

4. The mirror of claim 1, wherein the optical thickness profile of the first dielectric layer is essentially radially symmetrical.

5. The mirror of claim 1, wherein
   the optical thickness profile of the first dielectric layer is essentially radially symmetrical; and
   the optical thickness profile of the second dielectric layer is essentially radially symmetrical.

6. The mirror of claim 1, wherein the optical thickness profiles of the first and second dielectric layers are essentially equivalent.

7. The mirror of claim 1, wherein the optical thickness profiles of the first, second and third dielectric layers are essentially equivalent.

8. The mirror of claim 1, wherein the substrate includes an anti-reflective coating which defines the first surface.

9. A mirror according to claim 1, wherein the substrate consists of a material essentially transparent at the given wavelength $\lambda$.

* * * * *